United States Patent [19]

Vellinga

[11] Patent Number: 4,758,339
[45] Date of Patent: Jul. 19, 1988

[54] EQUIPMENT FOR THE ANAEROBIC PURIFICATION OF WASTE WATER

[75] Inventor: Sjoerd H. J. Vellinga, Tjalleberd, Netherlands

[73] Assignee: Paques B.V., Balk, Netherlands

[21] Appl. No.: 43,762

[22] Filed: Apr. 29, 1987

[30] Foreign Application Priority Data

May 1, 1986 [NL] Netherlands ............... 8601120

[51] Int. Cl.$^4$ .................................. B01D 21/02
[52] U.S. Cl. ........................... 210/188; 210/539
[58] Field of Search ............ 210/603, 180, 188, 261, 210/262, 539, 540

[56] References Cited

U.S. PATENT DOCUMENTS

| | | | |
|---|---|---|---|
| 4,253,956 | 3/1981 | Pette | 210/539 X |
| 4,391,704 | 7/1983 | Anderson | 210/188 |
| 4,530,762 | 7/1985 | Love | 210/603 |
| 4,613,434 | 9/1986 | Määttä | 210/180 X |
| 4,622,147 | 11/1986 | Vellinga | 210/539 |

FOREIGN PATENT DOCUMENTS 96825 6/1983 European Pat. Off. .
833184 10/1938 France .

Primary Examiner—Tom Wyse
Attorney, Agent, or Firm—Dennison, Meserole, Pollack & Scheiner

[57] ABSTRACT

To avoid considerable vertical and horizontal flows in the settler formed by gas collection hoods, of the upflow anaerobic sludge blanket (U.A.S.B.) reactor, each gas collection hood (3) debouches at one or two ends into a gas collection chamber (8) via one or more openings (19), the upper boundary of said openings being situated below the inside surface of the projection or the top of the hood (3) concerned. The gas collection hoods are situated immediately below the level of the effluent discharge and the depth of the settler is shallow. As a result of the decrease in pressure only a few gas bubbles are consequently liberated and the settling of the sludge is not appreciably disturbed.

4 Claims, 2 Drawing Sheets

EQUIPMENT FOR THE ANAEROBIC PURIFICATION OF WASTE WATER

The invention relates to equipment for the anaerobic purification of waste water, comprising a reactor with a fermentation section, a settler provided above said fermentation section, means for feeding waste water to the fermentation section, and means provided at the top of or above the settler for the discharge of purified water, which settler comprises at least one tier of gas collection hoods.

Such equipment is in practice often described by the term U.A.S.B. reactor, U.A.S.B. standing for "upflow anaerobic sludge blanket". Known equipment of this type often has two tiers of gas collection hoods, each hood of the lowermost tier being connected, for example, by an inclined pipe to a hood of the uppermost tier. However, a settler with a single tier of gas collection hoods is also possible. All the gas collected flows from the gas collection hoods of the lowermost tier or the single tier directly to a gas discharge pipe which is connected, for example, to a gasometer. This known type of anaerobic purification system may exhibit the disadvantage that as a result of turbulence, sludge and water are incompletely separated from each other in the settler, which has a detrimental effect on the efficiency of the system. Said turbulence is due, inter alia, to upward flows being produced in the settler due to miniscule small gas bubbles. These gas bubbles are produced as a result of it being possible for the water at greater depth to have more gas in solution than water at the surface. During upward flow, this supersaturation of gas will emerge from the water in the form of small bubbles. Once such a flow has been produced, it maintains itself as a result of the gas lift starting to operate and transporting water from greater depths. This has the result that large vertical and horizontal flows are produced in the settler.

The object of the invention is to avoid this disadvantage to a substantial extent and provide an anaerobic purification system of the type mentioned in the introduction in which at least the zone near the means for discharging purified water, usually constructed as overflow troughs, is free of turbulence and the separation between sludge and water is therefore optimum.

According to the invention, the equipment for this purpose is characterized in that each gas collection hood debouches at at least one end into a gas collection chamber via one or more openings, the upper boundary of said openings being situated below the inside surface of the projection or the top of the hood concerned.

As a result of using the invention, the only permitted flow is the flow of effluent. Because the gas collection hoods are placed immediately below the level of the effluent discharge and the depth of the total settler is low, at most only a few gas bubbles are liberated as a result of the decrease in pressure and the settling of the sludge cannot be appreciably disturbed.

Preferably, liquid-retaining means which prevent liquid flowing into the gas collection chamber during operation are provided near said openings.

There are various possibilities for constructing the liquid-retaining means, for example, valves which respond to gas pressure or liquid level. With a view to simplicity and operational reliability it is, however, preferable that said means consist of a receptacle with one or more openings in the rear wall facing the gas collection chamber and one or more openings in the upper or front wall, the liquid overflow level of said upper or front wall being situated above the top edge of the opening(s) in the rear wall.

The invention will now be explained in more detail on the basis of the figures which show an exemplary embodiment.

Figure 1:
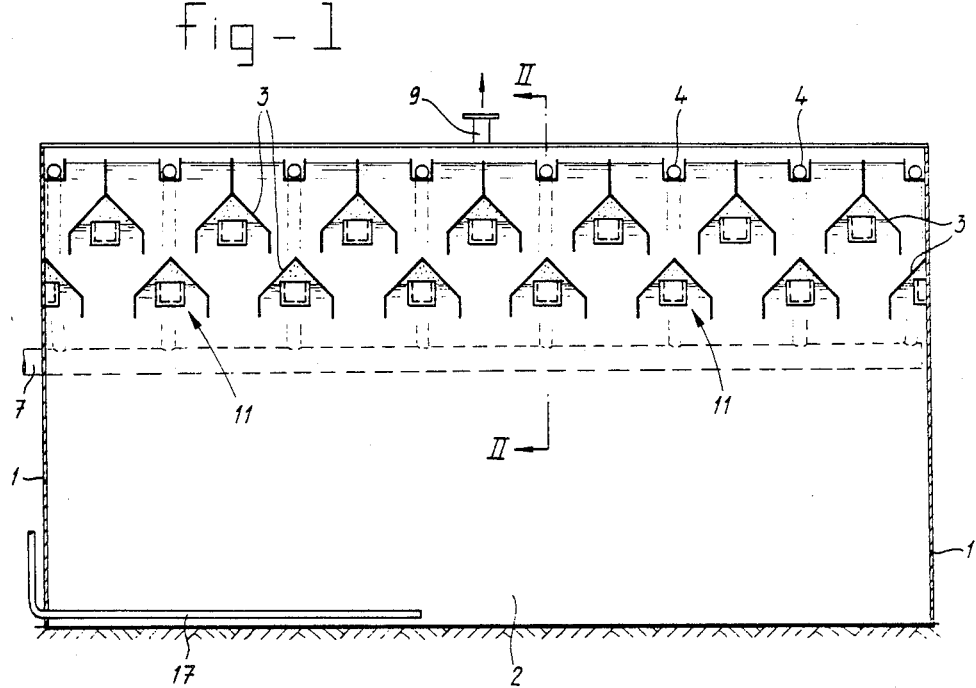
FIG. 1 shows a cross section through the reactor along the line I—I in FIG. 2.
Figure 2:
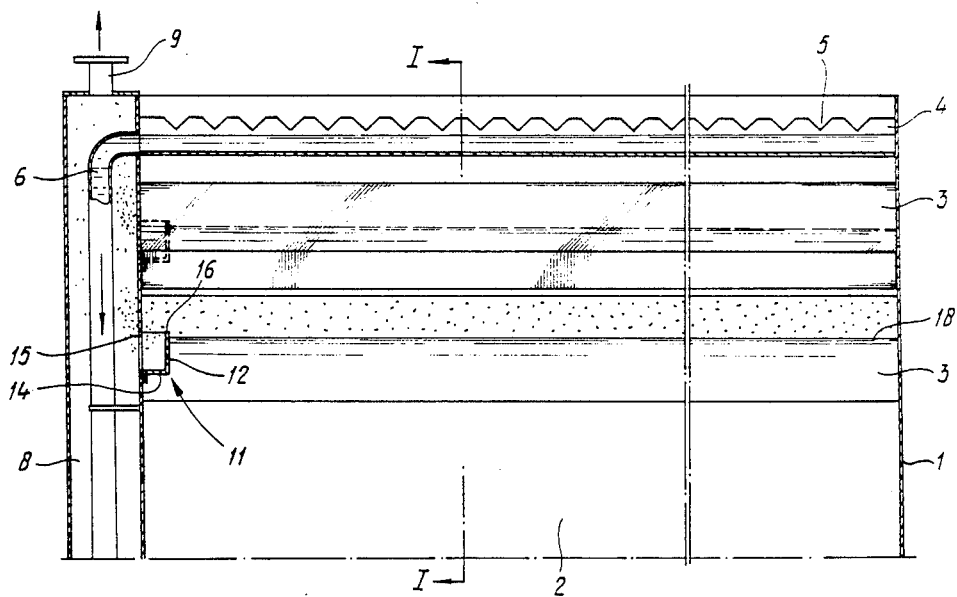
FIG. 2 shows a section along the line II—II in FIG. 1.
Figure 3:
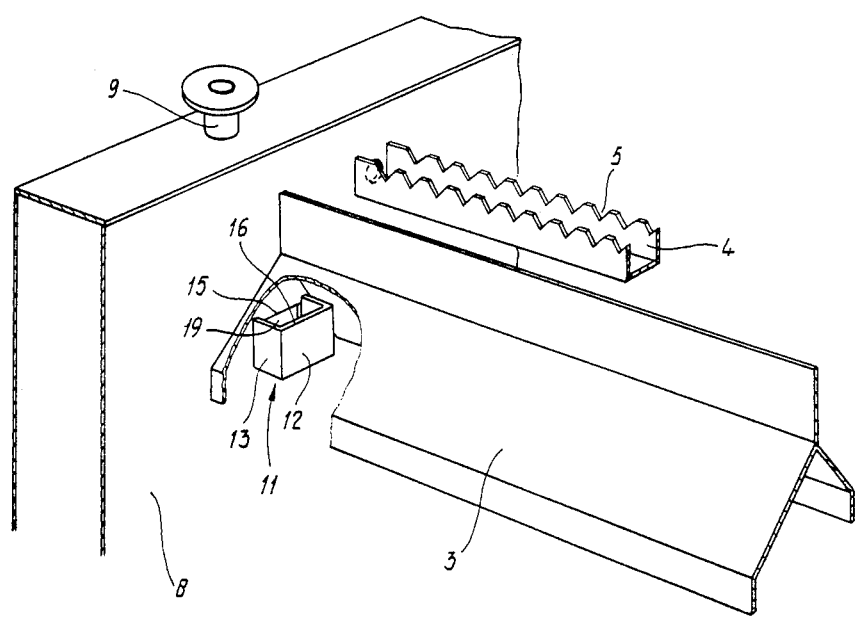
FIG. 3 shows a perspective view of a gas collection hood at the place where the latter debouches into the gas collection chamber, a part being imagined as broken away.

The equipment shown comprises a reactor 1, the lowermost part of which forms the fermentation section 2, while above said section 2 there is provided a settler in the form of two tiers of gas collection hoods 3. Above the uppermost tier of hoods 3 there is situated a number of overflow troughs 4 with V-shaped cutouts 5 in the side walls. These effluent troughs are intended to collect purified water. From each overflow trough 4 there runs a discharge pipe 6 to a discharge collection point 7.

Each gas collection hood 3 debouches at one end into a gas collection chamber 8 which is connected to a gas discharge 9. At the position of this debouchment a small receptacle 11 is provided consisting of a continuous front wall 12, continuous side wall 13 and a continuous base 14. The rear surface and the top surface of the small receptacles are open or provided with openings, the upper edge of the opening or openings in the rear surface being indicated by 15 and the upper edge of the front wall 12 by 16. It will be explained later why it is of importance that 16 is higher than 15.

A feed pipe 17 for waste water debouches into the fermentation section 2.

The operation of the equipment is as follows:

A layer of anaerobic sludge is provided on the bottom of the fermentation section 2. Waste water is fed via the pipe 17 and distributed over the bottom of the container 1 by means known per se which are not drawn. As a result of anaerobic fermentation, organic material is converted, inter alia, into fermentation gas (methane) which partly dissolves in the water and partly rises in the form of gas bubbles. The liquid level rises as a result of the influent fed in until said level reaches the top edge of the effluent troughs 4 and said troughs are filled with a current of purified water. Said purified water is discharged via the pipes 6 and 7.

The rising gas is collected in the gas collection hoods 3 and flows out of said hoods via the open top surface and open rear surface of the small receptacles 11 into the gas collection chamber 8 and is discharged therefrom via pipe 9. Because the top edge 16 of the front wall 12 is higher than the top edge 15 of the opening(s) in the rear surface of the small receptacles, liquid cannot flow into the gas collection chamber, since the gas pressure in each hood 3 will force the liquid level 18 back to just below the level of the top edge 16 of the front wall 12, after which gas can escape to the chamber 8. The gas pressure continues to be maintained at a virtually constant value which is sufficient to hold the liquid level below the edge 16. In fact, the receptacles act as locks for preventing liquid flowing into the gas collection chamber 8.

It will be clear that other constructions are conceivable for said locks (liquid-retaining means) such as a non-return valve responding to pressure or a valve regulated by liquid level. If the small receptacles 11 are chosen, and that is possible because of simplicity and operational reliability, it is also possible for the orifices for the gas to be situated at other positions. For example, the top surface of the small receptacles is closed and one or more openings are provided in the front wall 12. Instead of an open rear wall of the small receptacles, a number of openings may be chosen in an otherwise continuous rear wall. However, the liquid overflow edge of the opening(s) in the front wall should be higher than the top edge of the opening(s) in the rear wall.

Instead of a common gas collection chamber 8 each hood can have its own gas discharge. Other modifications are also possible within the scope of the invention.

I claim:

1. In a reactor for the anaerobic purification of waste water comprising a fermentation section including means for feeding waste water, a settler provided above said fermentation section, and means for discharge of purified water provided at the top of or above said settler, said settler comprising at least one tier of gas collection hoods, the improvement wherein each said hood includes a gas discharge means located at at least one end thereof, each gas discharge means including, in communication, an inlet means for gas to be discharged open to said hook and located below the top of said hood, and an outlet means for gas to be discharged having an upper boundary located below said inlet means, so as to prevent liquid from flowing into said gas discharge means.

2. A reactor according to claim 1, additionally comprising a gas collection chamber in communication with said outlet for gas to be discharged.

3. A reactor according to claim 2, wherein said gas discharge means comprises a receptacle including a plurality of walls, one said wall including said inlet means for gas to be discharged, and another said wall including said outlet means for gas to be discharged.

4. A reactor according to claim 3, wherein said inlet means is located in a wall facing the top of the hood or in a wall facing the length of the hood, and said outlet means is located in a wall facing the gas collection chamber.

* * * * *